United States Patent
Okamoto et al.

(10) Patent No.: US 6,846,103 B2
(45) Date of Patent: Jan. 25, 2005

(54) APPARATUS FOR CONTINUOUS STIRRING AND PROCESS FOR CONTINUOUS POLYCONDENSATION OF POLYMER RESIN

(75) Inventors: Naruyasu Okamoto, Tokyo (JP); Seiji Motohiro, Kudamatsu (JP); Yukika Itou, Tabuse (JP); Susumu Harada, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 168 days.

(21) Appl. No.: 10/229,070

(22) Filed: Aug. 28, 2002

(65) Prior Publication Data
US 2003/0227816 A1 Dec. 11, 2003

(30) Foreign Application Priority Data
Jun. 7, 2002 (JP) ....................... 2002-167388

(51) Int. Cl.[7] .................. B01F 7/18; B01F 7/32
(52) U.S. Cl. ............... 366/297; 366/300; 366/301; 366/325.4; 366/325.94; 366/303
(58) Field of Search .................. 366/325.94, 325.4, 366/297, 300, 301, 303; 422/135

(56) References Cited

U.S. PATENT DOCUMENTS

| | | | |
|---|---|---|---|
| 3,498,754 A | * 3/1970 | Yamashita et al. | 422/135 |
| 3,617,225 A | * 11/1971 | Kuehne et al. | 422/135 |
| 3,964,874 A | 6/1976 | Maruko | 366/300 |
| 4,776,703 A | 10/1988 | Oda | 366/303 |
| 6,265,525 B1 | * 7/2001 | Kinoshita et al. | 528/196 |

FOREIGN PATENT DOCUMENTS

| | | |
|---|---|---|
| EP | 1002820 | 5/2000 |
| JP | 55152534 | 11/1980 |
| JP | 10000342 | 1/1998 |

* cited by examiner

Primary Examiner—Tony G. Soohoo
(74) Attorney, Agent, or Firm—Antonelli, Terry, Stout & Kraus, LLP

(57) ABSTRACT

An apparatus for continuous stirring comprising a horizontal elongated cylindrical vessel and two rotating blade assemblies rotatable in the direction opposite to each other provided in parallel to each other in the vessel, where a liquid feed is moved from one end to another therethrough by rotation of the two rotating blade assemblies in the direction opposite to each other, while stirring and mixing the liquid feed, the two rotating blade assemblies each comprising rotor shafts (3a–3b or 3c–3d) supported at both ends of the rotating blade assemblies, support members (4) each fixed to the rotor shafts, connecting members (5) span between the support members (4) and in positions far from the substantial rotating shaft center and a plurality of plate-shaped stirring blades (6) arranged in parallel in the longitudinal direction of the substantial rotating shaft center and fixed to the connecting members (5).

9 Claims, 2 Drawing Sheets

US 6,846,103 B2

APPARATUS FOR CONTINUOUS STIRRING AND PROCESS FOR CONTINUOUS POLYCONDENSATION OF POLYMER RESIN

BACKGROUND OF THE INVENTION

1) Field of the Invention

The present invention relates to an apparatus and a process for stirring highly viscous materials, and more particularly to an apparatus for continuous stirring, suitable for continuous polycondensation or stirring, mixing or degassing of polycondensation series polymers (polymer resin) such as polyethylene terephthalate, polycarbonate, etc., and a process for continuous polycondensation of polymer resin.

2) Related Art

Horizontal elongated cylidrical apparatuses for continuous stirring or continuous treatment 8polycondensation, etc.) of polyethylene terephthalate, etc. have been so far disclosed in U.S. Pat. No. 4,776,703 (JP-A-62-112624), JP-A-3-239727 or U.S. Pat. No. 3,964,874 (JP-A-48-102894).

U.S. Pat. No. 4,776,703 discloses an apparatus for continuous treatment of a highly viscous material, which comprises a horizontal elongated cylindrical vessel and two rotating blade assemblies each comprising support rotors provided each at both end walls of the vessel, and a plurality of rectangular frame-shaped rod members connected to one another and spanned between the support rotors, where the adjacent rectangular frame-shaped rod members are connected to one another at a predetermined phase angle in the longitudinal direction of the vessel, thereby making the two rotating blade assemblies rotate in an intermeshed manner without any actual rotating center shaft spanned between the support rotor of the individual rotating blade assemblies.

U.S. Pat. No. 3,964,874 discloses an apparatus for continuous stirring of a viscous material, which comprises a cylindrical vessel, two rotating shafts provided in parallel to each other in the vessel, a plurality of elliptical plate members fixed to the rotating shaft as stirring blades and scraping plates fixed to the outermost ends of the individual elliptical plate members, where the scraping plates are in scraping contact with the entire inside wall of the vessel, thereby minimizing the dead space on the inside wall surface.

In the apparatus of U.S. Pat. No. 4,776,703, the two rotating blade assemblies are each made up of the rectangular frame-shaped rod members, whose adjacent ones are connected to each other at a predetermined phase angle and spanned between the rotor shafts, and thus are suitable for stirring and mixing a liquid feed having a high viscosity, for example, about 1,000 Pa•s or more with less resistance, but in the case of a liquid feed having a lower viscosity than about 1,000 Pa•s, the rectangular frame-shaped rod members only freely pass through the liquid feed without any effective scraping the liquid feed upwards, resulting in failure to promote evaporation of volatile matters and consequent prolongation of residence time.

The apparatus of U.S. Pat. No. 3,964,874 is suitable for stirring and mixing a liquid feed having a low viscosity, but in the case of a liquid feed having a higher viscosity than about a few hundred Pa•s, the stagnant high viscosity liquid feed deposited on the rotating shaft surfaces are liable to rotate together with the rotating shafts, so that the stagnant high viscosity liquid feed are highly susceptible to heat deterioration, etc., resulting in degrading of the quality of the resulting liquid product.

SUMMARY OF THE INVENTION

An object of the present invention is to solve the problems of the above prior arts, and to provide an apparatus for continuously stirring a viscous material, applicable to liquid feeds ranging from a low viscosity to a high viscosity to obtain the resulting liquid product of good quality and also a process for continuous polycondensation of polymer resin.

To attain the aforementioned object of the present invention, the present invention provides an apparatus for continuous stirring, which comprises a vessel and two rotating blade assemblies, rotatable in the direction opposite to each other, provided in parallel to each other in a horizontal direction in the vessel, where a liquid feed supplied from an inlet at one end of the vessel is stirred and mixed therein while moving the liquid feed from the one end to the other by rotation of the two rotating blade assemblies in the direction opposite to each other, the two rotating assemblies each comprising a plurality of rod-shaped connecting members arranged in a predetermined radius with a clearance (space) in a substantial rotating shaft center region and a plurality of plate-shaped stirring blades provided in parallel to one another in a longitudinal direction of the substantial rotating shaft center and fixed to the rod-shaped connecting members.

In the present invention, a polymer resin having a low degree of polymerization is continuously supplied as a liquid feed into the vessel of the apparatus for continuous stirring from the inlet and stirred by rotating the two rotating blade assemblies in the direction opposite to each other, while moving the liquid feed towards the outlet, thereby conducting good surface renewed to evaporate the volatile matters and enhance the degree of polymerization.

Other objects, features and advantages of the invention will become apparent from the following description of the embodiments of the invention taken in conjunction with the accompanying drawings.

Figure 1:
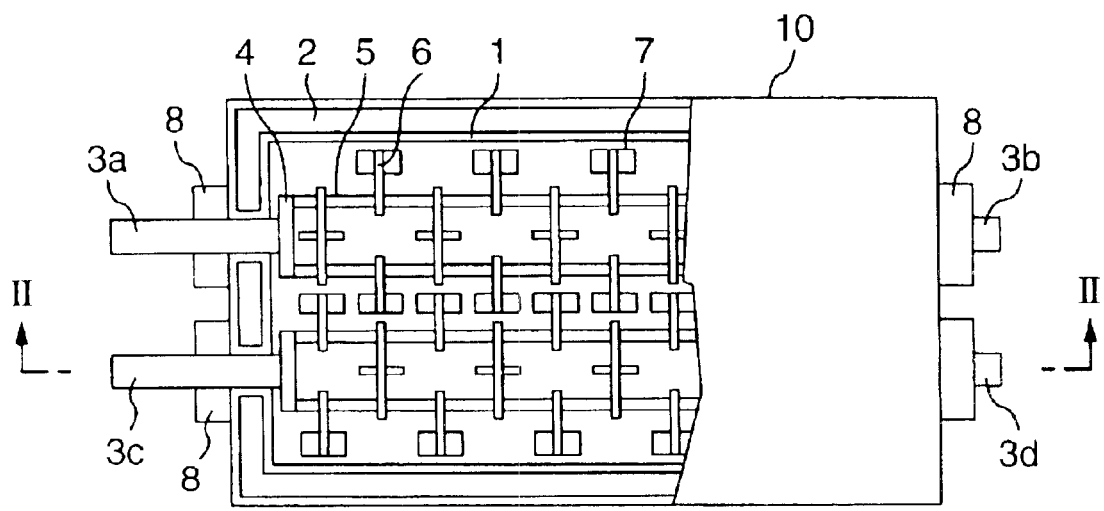
FIG. 1 is a partial cut-away plan view of an apparatus for continuous stirring according to one embodiment of the present invention.

In the foregoing FIGS. 1 to 4, reference numerals have the following meanings: 1: horizontal elongated cylindrical vessel, 2: heating medium jacket, 3a and 3c: first rotor shafts, 3b and 3d: second rotor shafts, 4: first and second support members, 5: rod-shaped, connecting member, 6: plate-shaped stirring blade, 6a and 6b: plate-shaped member, 7: scraping member, 8: bearing, 10: stirring apparatus proper, 11: inlet nozzle, 13: outlet nozzle, 13: heating medium inlet nozzle, 14: heating medium outlet nozzle, 15: outlet nozzle for volatile matters, 20: hole (opening), 21: clearance (space).

DETAILED DESCRIPTION OF THE INVENTION

Embodiments of the present invention will be described below, referring to FIGS. 1 to 4.

Figure 2:
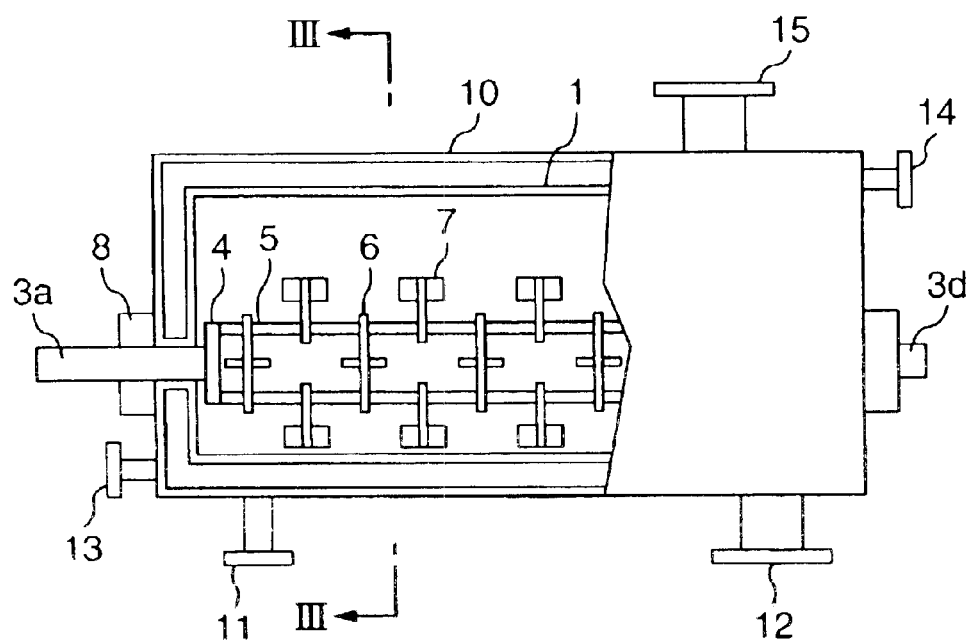
FIG. 2 is a partially cut-away elevation view along the line II—II of FIG. 1.
Figure 3:
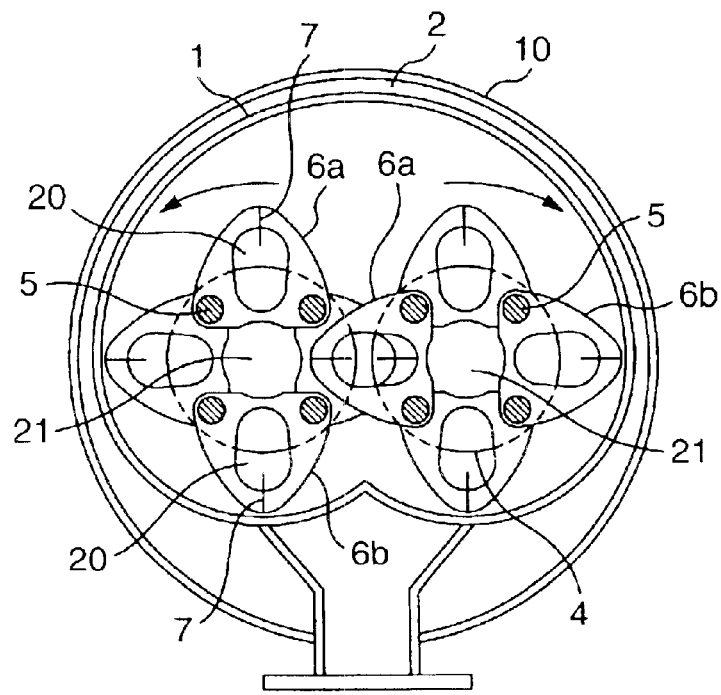
FIG. 3 is a vertical cross-sectional view along the line III—III of FIG. 2.

As shown in FIGS. 1 and 2, stirring apparatus proper 10 comprises a horizontal elongated cylindrical vessel 1 having a cross-section as shown in FIG. 3, provided in a horizontal direction of the apparatus 10, whose outer periphery is covered by heating medium jacket (heater) 2, to which a heating medium is supplied to heat the vessel 1. Through each of both ends in the longitudinal direction of the horizontal elongated cylindrical vessel 1 are penetrated two pairs of first rotor shafts 3a—second rotor shaft 3b, and first rotor shaft 3c—second rotor shaft 3d, each being supported in a rotatable manner by bearing 8, while the first rotor shaft 3a and the first rotor shaft 3c are each connected to a rotation driver provided outside the vessel 1 so that they can be driven to undergo synchronized rotation in the direction opposite to each other. First and second disk-shaped support members 4 are fixed to the first rotor shafts 3a and 3c, and to the second rotor shafts 3b and 3d, respectively, in positions near the both ends in the longitudinal direction of and within the vessel. The first disk-shaped support members 4 and the second disk-shaped support members are connected to each other by rod-shaped connecting members 5, as reinforcing members, i.e. 4 connecting members in this case, where the rod-shaped connecting members 5 may have partially different radii, depending on their spanning positions, but should be rod-shaped on the whole. The rod-shaped connecting members 5 are provided in the radial direction and in intermediate positions far from the substantial rotating shaft center. That is, the rod-shaped connecting members 5 are provided in positions far from the substantial rotating shaft center by about one half of the distance between the substantial rotating shaft center and the tip end of scraping blades 7 positioned at the outermost periphery and also in positions that should not interfere with plate-shaped members 6a and 6b making up plate-shaped stirring blades and also with scraping members 7 of the adjacent rotating blade assembly provided in parallel in the horizontal direction of the vessel 1.

Pairs of plate-shaped members 6a and 6b are supported by two counterposed rod-shaped connecting members 5 of the four rod-shaped connecting members 5 at a phase angle of 180°, respectively, and adjacent pairs of plate-shaped members 6a and 6b in the substantial rotating shaft center are likewise supported by the two counterposed connecting members 5 at a staggered phase angle of 90°. with respect to the farmer two pairs of plate-shaped members 6a and 6b. Scraping members 7 are fixed each to the tip ends of the plate-shaped members 6a and 6b.

Preferable intermediate position which the rod-shaped connecting members 5 are spanned between the first and second disk-shaped support members must be so located that the radius from the substantial rotating shaft center to the centers each of rod-shaped connecting members 5 can be selected from a range of about 0.3R—about 7R, where R is a radius from the substantial rotating shaft center to the outermost periphery of the scraping members 7. When the number of rod-shaped connecting members 5 is more than 4, the diameter of the rod-shaped connecting members 5 as reinforcing members can be made smaller without any fear of deteriorating the required strength, though depending on the size of pairs of the plate-shaped members 6a and 6b making up the plate-shaped stirring blades. In the foregoing embodiment, each of the plate-shaped members is supported by two rod-shaped connecting members 5, and thus total four rod-shaped connecting members 5 support each pair of the plate-shaped members, but the number of the rod-shaped connecting members 5 depends on the size of pairs of the phase-shaped members 6a and 6b making up the plate-shaped stirring blades, as mentioned above. A pair of the two rod-shaped connecting members 5 that support plate-shaped members 6a or 6b are provided symmetrically about the substantial rotating shaft center. A plurality of pairs of approximately triangular plate-shaped members 6a and 6b are provided and fixed to the rod-shaped connecting members 5 in the direction of substantial rotating shaft center. As is obvious from FIGS. 3 and 4, the approximately triangular plate-shaped members 6a and 6b each with a narrow sharp tip end are effective for mutual intermeshing arrangement between the rod-shaped connecting members 5 provided in the intermediate positions. When the rod-shaped connecting members 5 are provided nearer to the outermost periphery of the scraping members 7, for example, at about 0.7R, the outer profiles of plate-shaped members 6a and 6b can be approximated to an elliptical shape with an expanded center in the radial direction.

Figure 4:
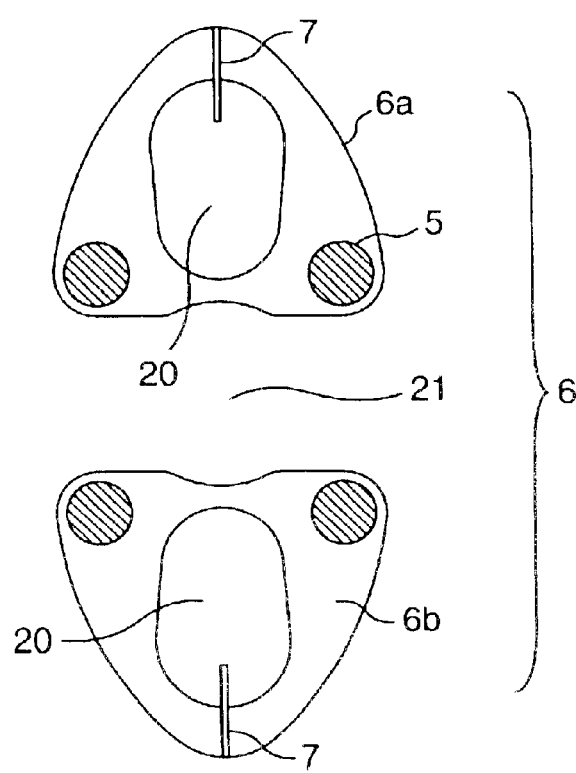
FIG. 4 is an enlarged view of plate-shaped stirring blades according to the present invention.

Pitch in the direction of substantial rotating shaft center of pairs of the plate-shaped members 6a and 6b as arranged in parallel may be made larger from the inlet side towards the outlet side of vessel 1, as disclosed in JP-A-3-239727. At the outermost periphery each of the pairs of plate-shaped members 6a and 6b are provided scraping members 7 (scraping plates or scraping bars) each at a right angle to the plate-shaped members 6a and 6b, thereby forming plate-shaped stirring blades (as provided symmetrically about the substantial rotating shaft center), each made up of a pair of the plate-shaped members with clearance 21 therebetween in the region of substantial rotating shaft center, thereby allowing the liquid feed to move through the clearance in the vertical direction and the axial direction, as shown in FIG. 4. Needless to say, scraping plates as scraping members 7 have a stronger scraping power. As shown in FIGS. 3 and 4, the plate-shaped members 6a and 6b making up plate-shaped stirring blades 6 each an elliptical hole 20 having an area large enough to make a portion of the liquid feed into a thin film state when the portion of the liquid feed scraped upwards by the scraping members 7 falls downward.

As shown in FIG. 3, the plate-shaped stirring blades 6 made up of such pairs of plate-shaped members 6a and 6b are fixed to the rod-shaped connecting members 5 multistage-wise while successively changing directions at a phase angle of 90° as viewed from the axial direction. When the rotor shafts 3a and 3c are synchronized to rotate in the direction opposite to each other, the plate-shaped stirring blades 6 themselves arranged in parallel in the horizontal direction of the vessel so as to correspond to the rotor shafts 3a and 3c are provided at a phase angle of 90° to one another, as shown in FIG. 3. The rotor shafts 3a–3b and 3c–3d are made to rotate in the direction opposite to each other so that the two sets of a pair of plate-shaped stirring blade can bring the liquid feed upward from the inner side in the horizontal elongated cylindrical vessel 1 of the stirring apparatus proper 10.

As described above, the rod-shaped connecting members 5 are provided in intermediate positions in the radial direction, the rod-shaped connecting members 5 each have a slower intermediate peripheral speed than the outermost peripheral speed of scraping members 7, and as shown in FIGS. 3 and 4, the members existing in the interior region enclosed by the rod-shaped connecting members 5 can be eliminated therefrom, thereby completely eliminating the parts making the liquid feed to undergo stagnant rotation i.e. parts substantially in a stagnant state. All the rod-shaped connecting members 5 can rotate at an intermediate peripheral speed, thereby reducing the resistance to the liquid feed and enabling the resolution rate of the rotating blade assemblies provided with plate-shaped stirring blades 6 having the scraping members to be changed in a broad range of 0.5 to 20 rpm.

Inlet nozzle 11 for the liquid feed is provided at the bottom or side wall at one end of the horizontal elongated cylindrical vessel 1 of stirring apparatus proper 10, whereas outlet nozzle 12 for the liquid product is provided at the bottom at the other end thereof. Outlet nozzle 15 for volatile matters is provided at the top thereof. Numerals 13 and 14 are an inlet nozzle and an outlet nozzle for the heating medium to and from the heating medium jacket 2, respectively.

By synchronized rotation in the direction opposite to each other of two rotating blade assemblies comprising first rotor shaft 3$a$-second rotor shaft b and first rotor shaft 3$c$-second rotor shaft 3$d$, first and second support members 4 fixed each to the corresponding ends of the first and second rotor shafts, a plurality of rod-shaped connecting members 5 spanned in the radial direction and in intermediate positions, which is far from the substantial rotating shaft center, but inner from the outermost periphery of the scraping members 7 between the first and second support members 4 as reinforcing members, and a plurality of plate-shaped stirring blades 6 arranged in parallel to one another along and fixed to the rod-shaped connecting members 5 as structured in the aforementioned manner, a liquid feed is supplied into the vessel 1 of stirring apparatus proper 10 from the inlet nozzle 11 and moves therethrough in the direction toward the outlet nozzle 12 while undergoing stirring and mixing actions, and after the desired polycondensation reaction the resulting liquid product is continuously discharged from the outlet nozzle 12 to the outside of the stirring apparatus proper 10, where the liquid feed is scraped upwards by scraping members 7 fixed to the tip ends of stirring blades 6 and is made to fall downwards in a thin film state along the surfaces of the plate-shaped members 6$a$ and 6$b$ to evaporate the volatile matters off from the liquid feed. Needless to say, the rod-shaped connecting members 5 rotate in the above-mentioned given radius, and thus the liquid feed is also made to fall in a thin film state from the surfaces of the rod-shaped connecting members 5 to evaporate the volatile matters off from the liquid feed. Scraping members 7 scrape the inner wall surface of the vessel 1 of stirring apparatus proper 10.

As already described above, the two rotating blade assemblies each have no actual rotating shaft counter, but only a substantial rotating shaft center, i.e. an imaginary rotating shaft center. In the space of the actual rotating shaft center there are neither rod-shaped connecting members 5 nor parts of plate-shaped members 6$a$ and 6$b$ making up the stirring blades. As a result, deposition and rotation of the stagnant liquid feed can be suppressed, while necessary conditions for stirring, mixing, degassing and movement of the liquid feed can be maintained.

According to one preferable embodiment of the present invention, the approximately triangular plate-shaped members 6$a$ and 6$b$ each have an elliptical hole 20, as shown in FIG. 4. With such approximately triangular plate-shaped members 6$a$ and 6$b$, a portion of the liquid feed scraped onto the scraping members 7 is made to fall downwards or trickle down in a thin film state in the region of hole 20 (opening) of the approximately triangular plate-shaped members 6$a$ and 6$b$, thereby more effectively promoting evaporation of volatile matters. That is, the liquid feed is deposited so thick on the surfaces of the plate-shaped members 6$a$ and 6$b$ that evaporation of volatile matters cannot be promoted, but the liquid feed is formed into a thin film stage in the region of said hole 20 (opening) and trickled down, so that the evaporation of volatile matters can be much more promoted.

When continuous polycondensation of polyethylene terephthalate, etc. is carried out in the present stirring apparatus, an intermediate polymer having an inlet viscosity of a few Pa•s to a few tens of Pa•s is supplied as a liquid feed into vessel 1 of stirring apparatus proper 10 from inlet nozzle 11, and the vessel 1 of the stirring apparatus proper 10 is heated to 260°–300° C. by a heating medium introduced into heating medium jacket (heater) 2, and kept to a pressure of 0.01–10 kPa by an evacuating means connected through outlet nozzle 15 for volatile matters. Two rotating blase assemblies with stirring blades 6 provided horizontally in parallel to each other in the vessel 1 are made to rotate in the direction opposite to each other in a range of 0.5–20 rpm, thereby subjecting the fed intermediate polymer to stirring and surface renewal and consequent evaporative removed of volatile matters such as ethylene glycol, etc. from the intermediate polymer. The height of the liquid level of the liquid feed is about ⅓ to about 1 of the height H from the bottom of the vessel 1 to the substantial rotating shaft center. The liquid feed, while flowing from the inlet nozzle to the outlet nozzle, undergoes repeated stirring and surface renewal by the stirring blades 6 to carry out polycondensation of the liquid feed, and finally polymers having a higher viscosity, e.g. a few hundred to a few thousand Pa•s, can be obtained. The resulting liquid product having a higher degree of polymerization and a higher viscosity is discharged from outlet nozzle 12 to the outside of the stirring apparatus proper 10, and led to post-treatment steps such as chip cutter, etc. Volatile matters such as ethylene glycol, etc. separated during the polycondensation are discharged through outlet nozzles 15 of the outside of the stirring apparatus proper 10.

Likewise, the present invention can be also applied to production of polymer resins such as polyactual, polyamide, polycarbonate, etc. besides the polyester-based materials such as polyethylene terephthalate, etc.

Heretofore, treatment of a liquid feed ranging from an inlet viscosity of a few tens Pa•s to a high outlet viscosity of about 1,000 Pa•s or treatment of a liquid feed ranging from an inlet viscosity of about 1,000 Pa•s to a high outlet viscosity of about 10,000 Pa•s has been carried out in a divided manner, but the present invention provides a continuous treatment of a liquid feed from a low inlet viscosity of a few Pa•s to a polymer product having a high viscosity of a few ten thousand Pa•s without any quality deterioration. In the present invention, treatment of a liquid feed ranging from an inlet viscosity of about 100 Pa•s to an outlet viscosity of about 20,000 Pa•s can be preferably carried out.

According to the present invention, stagnation of a liquid feed due to deposition on the surfaces of rotating shafts and rotation of stagnant polymer products having a viscosity on the actual rotating shafts in the conventional stirring apparatus can be eliminated and quality deterioration due to scaling, etc. can be also prevented by reducing the dead space in the stirring apparatus. Thus, highly viscous materials can be effectively and continuously treated in a high quality in the present invention.

According to the present invention, a liquid feed in a broad range of a low viscosity to a high viscosity can be effectively stirred and mixed in one stirring apparatus.

In the foregoing embodiments of the present invention, 4 rod-shaped connecting members are used for one rotating blade assembly, but three rod-shaped connecting members can be used for one rotating blade assembly, where plate-shaped members are successively fixed to two of the three rod-shaped connecting members at a phase angle of 120°.

That is, at least three rod-shaped connecting members can make up the necessary structure of one rotating blade assembly, and number of the rod-shaped connecting members can be selected properly as required.

It will be further understood by those skilled in the art that although the foregoing description has been made on embodiments of the invention, the invention is not limited thereto and various changes and modifications may be made without departing from the spirit of the invention and the scope of the appended claims.

What is claimed is:

1. An apparatus for continuous stirring, which comprises a vessel, and two rotating blade assemblies rotatable in the direction opposite to each other, provided in parallel to each other in the horizontal direction in the vessel, where a liquid feed supplied into the vessel from an inlet is moved from one end to other therethrough by rotation of the two rotating blade assemblies in the direction opposite to each other, while stirring and mixing the liquid feed, the two rotating blade assemblies each comprising a first rotor shaft supported by a bearing provided at one end of the vessel in a rotatable manner, a second rotor shaft supported by another bearing provided at the other end of the vessel in a rotatable manner, a first support member fixed to the first rotor shaft near the one end of and within the vessel, a second support member fixed to the second rotor shaft near the other end of and within the vessel, connecting members spanned between the first support member and the second support member while forming a clearance in the region of a substantial rotating shaft center, and a plurality of plate-shaped stirring blades provided in parallel to one another in the longitudinal direction of the substantial rotating shaft center and fixed to the connecting members, wherein the plate-shaped stirring blades are pairs of plate-shaped members, each pair being arranged symmetrically about the substantial rotating shaft center.

2. An apparatus for continuous stirring, which comprises a horizontal elongated cylindrical vessel with an inlet for supplying a liquid feed at one end thereof in the longitudinal direction, an outlet for discharging a stirred and mixed liquid product at the other end thereof and an outlet for volatile matters at the top thereof, and two rotating blade assemblies rotatable in the direction opposite to each other, provided in parallel to each other in the horizontal direction in the vessel, where a liquid feed supplied into the vessel from the inlet is moved from the one end to the other by rotation of the two rotating blade assemblies in the direction opposite to each other, while stirring and mixing the liquid feed, the two rotating blade assemblies each comprising a first rotor shaft supported by a bearing provided at one end of the vessel in a rotatable manner, a second rotor shaft supported by another bearing provided at the other end of the vessel in a rotatable manner, a first support member fixed to the first rotor shaft near the one end of and within the vessel, a second support member fixed to the second rotor shaft near the other end of and within the vessel, a plurality of connecting members spanned between the first support member and the second support member, provided in a predetermined distance from a substantial rotating shaft center in the radial direction, and a plurality of plate-shaped stirring blades provided in parallel to one another in the longitudinal direction of the substantial rotating shaft center and fixed to a plurality of the connecting members, thereby forming a clearance in the region of the substantial rotating shaft center, wherein the plate-shaped stirring blades are pairs of plate-shaped members, each pair being arranged symmetrically about the substantial rotating shaft center.

3. An apparatus according to claim 2, wherein the plate-shaped stirring blades are fixed to the connecting members multistage-wise by successively changing the direction of the plate-shaped stirring blades at a phase angle of 90° in the longitudinal direction of the substantial rotating shaft center.

4. An apparatus according to claim 2, wherein the plate-shaped stirring blades are each provided with a scraping member at the outer periphery.

5. An apparatus according to claim 2, wherein the plate-shaped stirring blades each have a hole for making the liquid feed into a thin film stage when the liquid feed is trickled down.

6. An apparatus according to claim 2, wherein the plate-shaped stirring blades are each made up of an approximately triangular plate-shaped member.

7. A process for continuous polycondensation of polymer resin in an apparatus for continuous stirring, which comprises a vessel, and two rotating blade assemblies rotatable in the direction opposite to each other, provided in parallel to each other in the horizontal direction in the vessel, where a liquid feed supplied into the vessel from an inlet is moved from one end to other therethrough by rotation of the two rotating blade assemblies in the direction opposite to each other, while stirring and mixing the liquid feed, the two rotating blade assemblies each comprising a first rotor shaft supported by a bearing provided at one end of the vessel in a rotatable manner, a second rotor shaft supported by another bearing provided at the other end of the vessel in a rotatable manner, a first support member fixed to the first rotor shaft near the one end of and within the vessel, a second support member fixed to the second rotor shaft near the other end of and within the vessel, connecting members spanned between the first support member and the second support member while forming a clearance on the region of a substantial rotating shaft center, and a plurality of plate-shaped stirring blades provided in parallel to each other in the longitudinal direction of the substantial rotating shaft center and fixed to the connecting members, wherein the plate-shaped stirring blades are pairs of plate-shaped members, each pair being arranged symmetrically about the substantial rotating shaft center, characterized by continuously supplying a polymer resin having a low degree of polymerization as the liquid feed into the vessel from the inlet, stirring the liquid feed by rotation of the two rotating blade assemblies in the direction opposite to each other, thereby carrying out good surface renewal and evaporation of volatile matters, and moving the liquid feed towards the outlet, thereby enhancing the degree of polymerization.

8. A process according to claim 7, wherein the liquid feed supplied to the inlet has a viscosity of a few Pa•s or more and a liquid product discharged from the outlet has a viscosity enhanced to a few k Pa•s or less.

9. A process according to claim 7, wherein the plate-shaped stirring blades are rotated at a rotating rate ranging from 0.5 rpm to 20 rpm.

* * * * *